(12) United States Patent
Kumar et al.

(10) Patent No.: US 12,515,648 B2
(45) Date of Patent: Jan. 6, 2026

(54) SYSTEM AND METHOD FOR TRAINING A POLICY USING CLOSED-LOOP WEIGHTED EMPIRICAL RISK MINIMIZATION

(71) Applicant: Woven by Toyota, Inc., Tokyo (JP)

(72) Inventors: Eesha Kumar, London (GB); Yiming Zhang, Palo Alto, CA (US); Stefano Pini, London (GB); Simon A. I. Stent, Cambridge, MA (US); Ana Sofia Rufino Ferreira, Berkeley, CA (US); Sergey Zagoruyko, London (GB); Christian Samuel Perone, London (GB)

(73) Assignee: Woven By Toyota, Inc., Tokyo (JP)

( * ) Notice: Subject to any disclaimer, the term of this patent is extended or adjusted under 35 U.S.C. 154(b) by 354 days.

(21) Appl. No.: 18/110,082

(22) Filed: Feb. 15, 2023

(65) Prior Publication Data

US 2024/0092356 A1   Mar. 21, 2024

Related U.S. Application Data

(60) Provisional application No. 63/406,489, filed on Sep. 14, 2022.

(51) Int. Cl.
*B60W 30/095* (2012.01)
*B60W 60/00* (2020.01)

(52) U.S. Cl.
CPC ...... *B60W 30/095* (2013.01); *B60W 60/0027* (2020.02)

(58) Field of Classification Search
CPC ............ B60W 30/095; B60W 60/0027; G06N 20/00; G06N 3/09; G06N 3/092
See application file for complete search history.

(56) References Cited

U.S. PATENT DOCUMENTS

| 11,126,180 B1 * | 9/2021 | Kobilarov | ....... B60W 30/18163 |
| 11,741,274 B1 * | 8/2023 | Crego | .................... G06N 3/047 |
| | | | 703/8 |

(Continued)

FOREIGN PATENT DOCUMENTS

| CA | 3099659 A1 * | 11/2019 | ......... G05B 23/0294 |
| CN | 114630042 A * | 6/2022 | ............... H04N 5/77 |

(Continued)

OTHER PUBLICATIONS

Liu, E. Z., Haghgoo, B., Chen, A. S., Raghunathan, A., Koh, P. W., Sagawa, S., Liang, P., & Finn, C. (2021). Just Train Twice: Improving Group Robustness without Training Group Information.

(Continued)

*Primary Examiner* — Babar Sarwar
(74) *Attorney, Agent, or Firm* — Christopher G. Darrow; Darrow Mustafa PC

(57) ABSTRACT

Systems and methods for training a policy are disclosed. In one example, a system includes a processor and a memory with instructions that cause the processor to train the policy using a training data set with training scenes to generate an identification policy and perform a closed-loop simulation on the identification policy to collect closed-loop metrics. Based on the closed-loop metrics, the instructions cause the processor to construct an error set of the training scenes and construct an upsampled training set by upsampling the error set. After that, the policy is trained using the upsampled training set to generate a final policy.

20 Claims, 5 Drawing Sheets

(56) References Cited

U.S. PATENT DOCUMENTS

| | | | |
|---|---|---|---|
| 11,938,966 B1* | 3/2024 | Besson | B60W 60/00 |
| 12,071,157 B1* | 8/2024 | Prioletti | B60W 50/0098 |
| 12,103,521 B2* | 10/2024 | Das | B60W 30/0956 |
| 12,162,500 B1* | 12/2024 | Egbert | B60W 50/0205 |
| 12,175,764 B1* | 12/2024 | Song | G06N 3/04 |
| 2016/0107682 A1* | 4/2016 | Tan | B60W 30/18163 701/41 |
| 2017/0043768 A1* | 2/2017 | Prokhorov | B60W 10/04 |
| 2017/0063599 A1* | 3/2017 | Wu | H04L 41/40 |
| 2018/0032891 A1* | 2/2018 | Ba | B60W 50/14 |
| 2020/0074266 A1* | 3/2020 | Peake | G06F 18/2411 |
| 2020/0110416 A1* | 4/2020 | Hong | G06N 20/00 |
| 2021/0080969 A1* | 3/2021 | Hayes | B60W 60/001 |
| 2021/0192748 A1* | 6/2021 | Morales Morales | G06N 3/044 |
| 2022/0055618 A1* | 2/2022 | Toyoda | B60W 40/04 |
| 2022/0180890 A1* | 6/2022 | Ramaiah | G06N 20/00 |
| 2022/0204034 A1* | 6/2022 | Stein | B60W 30/095 |
| 2022/0227367 A1* | 7/2022 | Kario | G06V 40/103 |
| 2022/0234578 A1* | 7/2022 | Das | G08G 1/166 |
| 2022/0247618 A1* | 8/2022 | Côté | H04B 10/03 |
| 2023/0030104 A1* | 2/2023 | Puchkarev | B60W 50/0205 |
| 2023/0120917 A1* | 4/2023 | Muthusami | G08G 1/22 701/26 |
| 2023/0195122 A1* | 6/2023 | Shenfeld | G06V 20/588 701/26 |
| 2023/0326159 A1* | 10/2023 | Shayani | G06N 3/047 345/419 |
| 2023/0326335 A1* | 10/2023 | Ding | B60W 60/0027 701/117 |
| 2023/0339526 A1* | 10/2023 | Kernwein | B61L 29/24 |
| 2023/0351772 A1* | 11/2023 | Poltoraski | B60W 40/04 |
| 2023/0373529 A1* | 11/2023 | Tomov | B60W 60/0027 |
| 2024/0078470 A1* | 3/2024 | Lindenau | B60W 50/0098 |
| 2024/0229732 A1* | 7/2024 | Abrosimov | B61L 15/0058 |
| 2024/0394541 A1* | 11/2024 | Cemgil | G06N 3/084 |
| 2024/0400045 A1* | 12/2024 | Gochev | B60W 50/0097 |

FOREIGN PATENT DOCUMENTS

| | | | | | |
|---|---|---|---|---|---|
| DE | 102022209278 | A1 | * | 3/2024 | G06N 20/00 |
| GB | 2605991 | A | * | 10/2022 | G06N 3/044 |
| KR | 102626145 | B1 | * | 1/2024 | B60W 60/0011 |
| WO | WO-2020224910 | A1 | * | 11/2020 | G06N 3/044 |
| WO | WO-2020250019 | A1 | * | 12/2020 | B60W 30/0956 |
| WO | WO-2021206681 | A1 | * | 10/2021 | B60R 25/31 |

OTHER PUBLICATIONS

M. Bansal, A. Krizhevsky, A. Ogale. "ChauffeurNet: Learning to Drive by Imitating the Best and Synthesizing the Worst." Dec. 7, 2018. arXiv:1812.03079v1.

Scheel, Oliver. Luca Bergamini, Maciej Wolczyk, Blazej Osinski, and Peter Ondruska. "Urban driver: Learning to drive from real-world demonstrations using policy gradients." In Conference on Robot Learning, pp. 718-728. PMLR, 2022. https://proceedings.mlr.press/v164/scheel22a/scheel22a.pdf.

Idrissi, Badr Youbi, Martin Arjovsky, Mohammad Pezeshki, and David Lopez-Paz. "Simple data balancing achieves competitive worst-group-accuracy." In Conference on Causal Learning and Reasoning, pp. 336-351. PMLR, 2022. https://proceedings.mlr.press/v177/idrissi22a/idrissi22a.pdf.

Kirichenko, Polina, Pavel Izmailov, and Andrew Gordon Wilson. "Last layer re-training is sufficient for robustness to spurious correlations." arXiv preprint arXiv:2204.02937 (2022). https://arxiv.org/pdf/2204.02937.

Shimodaira, Hidetoshi. "Improving predictive inference under covariate shift by weighting the log-likelihood function." Journal of statistical planning and inference 90, No. 2 (2000): 227-244. https://www.academia.edu/download/3243628/Shimodaira_JSPI2000.pdf.

Ross, Stephane, and Drew Bagnell. "Efficient reductions for imitation learning." In Proceedings of the thirteenth International conference on artificial intelligence and statistics, pp. 661-668. JMLR Workshop and Conference Proceedings, 2010. http://proceedings.mlr.press/v9/ross10a/ross10a.pdf.

* cited by examiner

SYSTEM AND METHOD FOR TRAINING A POLICY USING CLOSED-LOOP WEIGHTED EMPIRICAL RISK MINIMIZATION

CROSS-REFERENCE TO RELATED APPLICATION

This application claims priority to U.S. Provisional Patent Application No. 63/406,489 filed Sep. 14, 2022, the contents of which are hereby incorporated by reference in its entirety.

TECHNICAL FIELD

The subject matter described herein relates, in general, to systems and methods for training a policy.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Behavioral cloning policies are trained in an open-loop fashion to predict the next action given an immediate previous action. However, learning in an open-loop fashion leads to a distributional shift between training and deployment, as the model does not understand the closed-loop effects of its actions when passively learning from a data set. In particular, regarding policies related to self-driving vehicles ("SDVs"), training policies in an open-loop fashion may result in actions taken by a vehicle that are either dangerous or illogical due to the distributional shift between training and deployment.

SUMMARY

This section generally summarizes the disclosure and is not a comprehensive explanation of its full scope or all its features.

In one embodiment, a method for training a policy includes the steps of training the policy using a training data set having training scenes to generate an identification policy and performing a closed-loop simulation on the identification policy to collect closed-loop metrics. Based on the closed-loop metrics, the method constructs an error set of the training scenes and an upsampled training set by upsampling the error set. Finally, the method trains the policy using the upsampled training set to generate a final policy.

In another embodiment, a system includes a processor and a memory with instructions that cause the processor to train the policy using a training data set with training scenes to generate an identification policy and perform a closed-loop simulation on the identification policy to collect closed-loop metrics. Based on the closed-loop metrics, the instructions cause the processor to construct an error set of the training scenes and construct an upsampled training set by upsampling the error set. After that, the policy is trained using the upsampled training set to generate a final policy.

In yet another embodiment, a non-transitory computer-readable medium includes instructions that cause a processor to train the policy using a training data set with training scenes to generate an identification policy and perform a closed-loop simulation on the identification policy to collect closed-loop metrics. Like before, based on the closed-loop metrics, the instructions cause the processor to construct an error set of the training scenes and an upsampled training set by upsampling the error set. Finally, the policy is trained using the upsampled training set to generate a final policy.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method to improve the training of a policy using closed-loop weighted empirical risk minimization (CW-ERM). Policies trained using this methodology can be utilized in a number of different applications, such as autonomous driving systems. To provide a broad overview of CW-ERM, reference is made to FIG. 1, which illustrates a process flow 10 of the CW-ERM method. The process flow 10 can essentially be broken up into two parts. The first part is a traditional open-loop empirical risk minimization (ERM) training 12 and the second part is the CW-ERM training 14. ERM is a principle in statistical learning theory that defines a family of learning algorithms and is used to give theoretical bounds on their performance.

During the ERM training 12, a policy is first trained to generate an identification policy ($\pi_{ERM}$) using a training data set ($\mathcal{D}$). During the CW-ERM training 14, a closed-loop simulation is performed on the identification policy ($\hat{\pi}_{ERM}$) to generate error metrics. These error metrics are then utilized to construct an error set $$(E_{\hat{\pi}_{ERM}}),$$

which is upsampled to create an upsampled data set ($\mathcal{D}_{up}$). Finally, this upsampled data set ($\mathcal{D}_{up}$) is then utilized for training the policy to generate the final policy ($\hat{\pi}_{CW-ERM}$). By using this methodology, mismatches between training and inference can be reduced by taking advantage of a closed-loop simulator to identify important samples for closed-loop performance.

Figure 1:
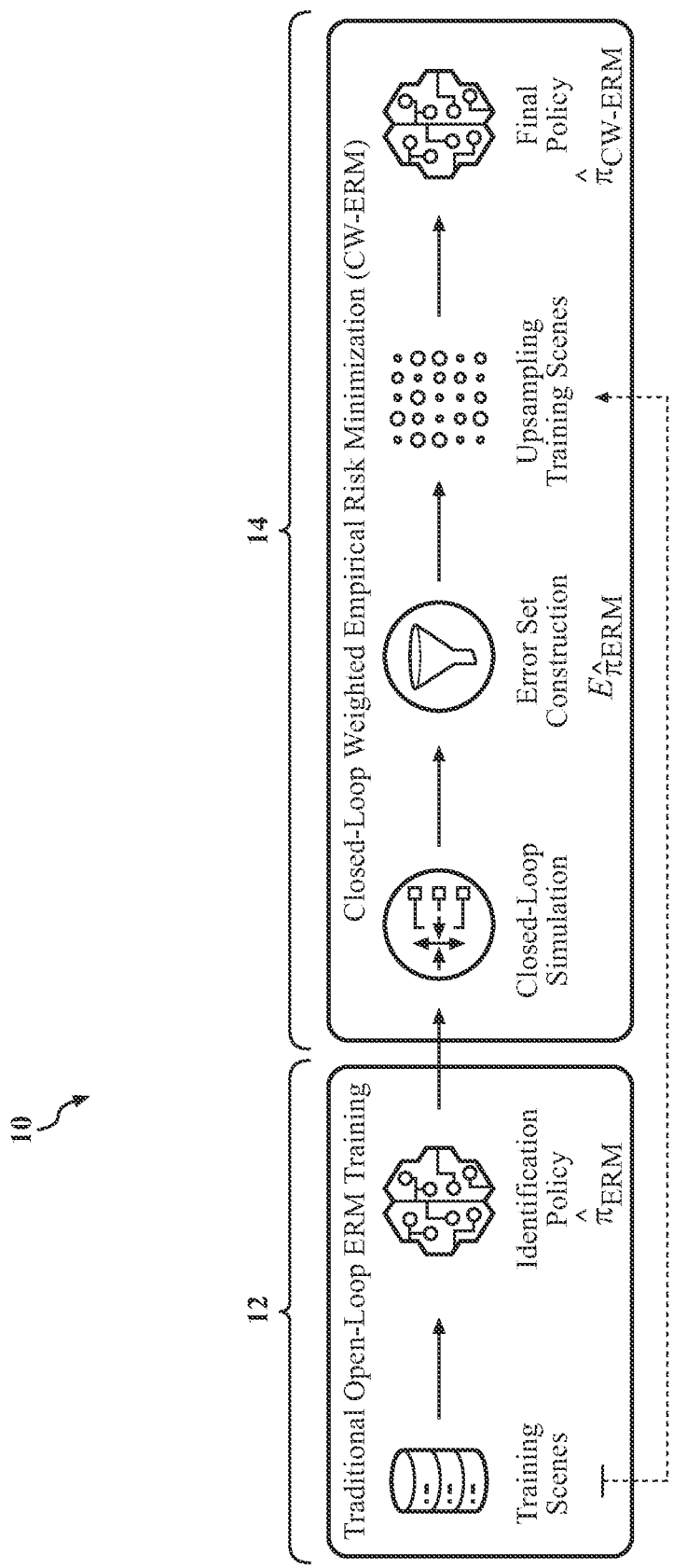
FIG. 1 illustrates a process flow for training a policy using closed-loop weighted empirical risk minimization.
Figure 2:
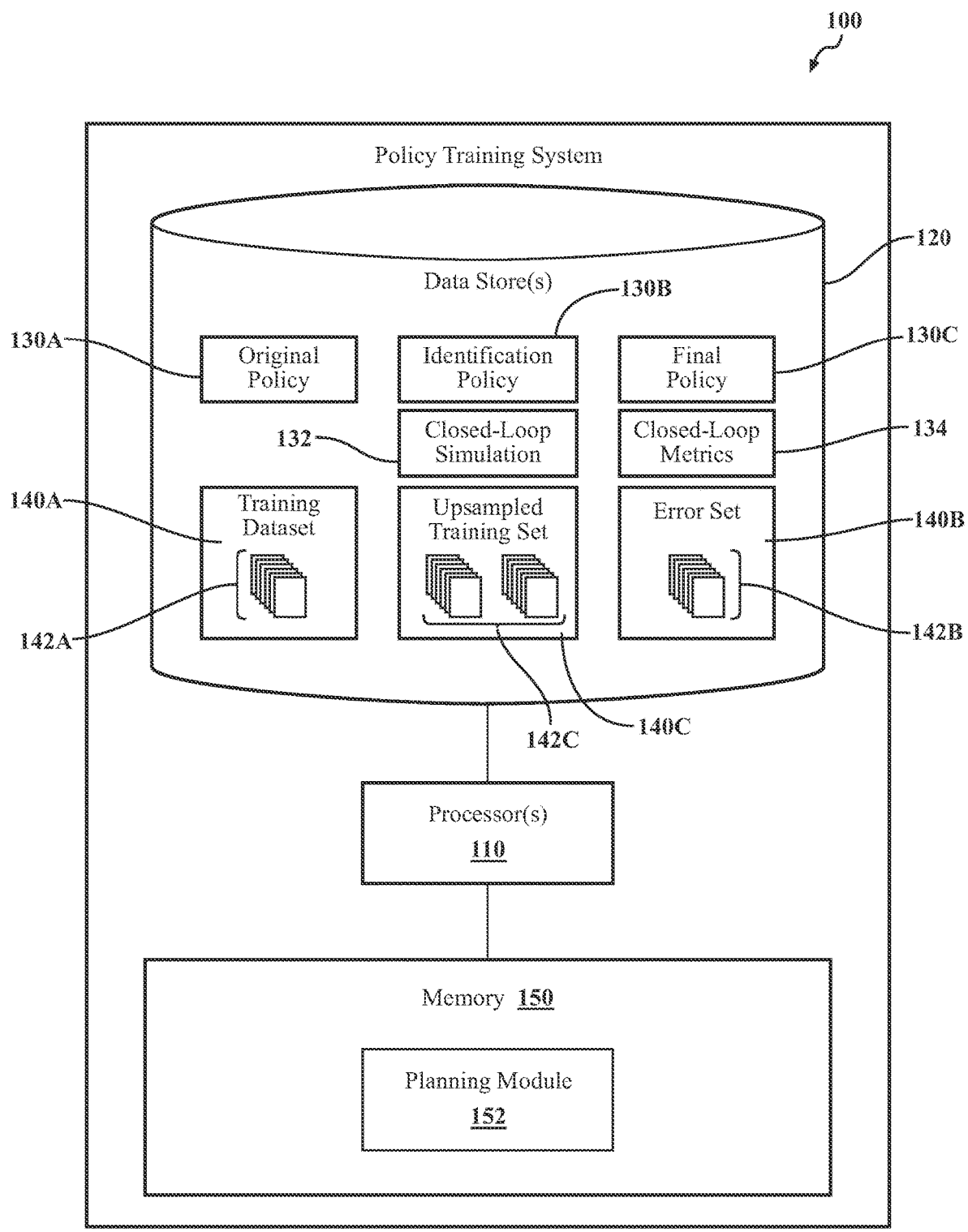
FIG. 2 illustrates a system for training a policy using closed-loop weighted empirical risk minimization.

Referring to FIG. 2, a policy training system 100 is illustrated for training a policy using the principles identified in the process flow 10 of FIG. 1. It should be understood that the policy training system 100 is just one example of a system that can be utilized to train a policy using the principles identified in the process flow 10 of FIG. 1. As shown, the policy training system 100 includes one or more processor(s) 110. Accordingly, the processor(s) 110 may be a part of the policy training system 100 or the policy training system 100 may access the processor(s) 110 through a data bus or another communication path. In one or more embodiments, the processor(s) 110 is an application-specific integrated circuit that is configured to implement functions associated with a training module 152. As will be explained later, the training module 152 stores instructions for executing the training of a policy or any other methodologies described herein.

In general, the processor(s) 110 is an electronic processor, such as a microprocessor, capable of performing various functions described herein. In one embodiment, the policy training system 100 includes a memory 150 that stores the training module 152. The memory 150 is a random-access memory (RAM), read-only memory (ROM), a hard disk drive, a flash memory, or other suitable memory for the training module 152. The training module 152 is, for example, computer-readable instructions that, when executed by the processor(s) 110, cause the processor(s) 110 to perform the various functions disclosed herein.

Furthermore, in one embodiment, the policy training system 100 includes one or more data store(s) 120. The data store(s) 120 is, in one embodiment, an electronic data structure such as a database that is stored in the memory 150 or another memory and that is configured with routines that can be executed by the processor(s) 110 for analyzing stored data, providing stored data, organizing stored data, generating stored data, and so on. Thus, in one embodiment, the data store(s) 120 stores data used or otherwise generated by the training module 152 in executing various functions.

In this example, the data store(s) 120 may store different policies, such as the original policy ($\hat{\pi}_{ORIG}$) 130A, the identification policy ($\hat{\pi}_{ERM}$) 130B, and the final policy ($\hat{\pi}_{CE\text{-}ERM}$) 130C. In addition, the data store(s) 120 may store different training data sets. For example, the data store(s) 120 may store the training data set ($\mathcal{D}$) 140A that includes the scenes 142A, the error set $$(E_{\hat{\pi}_{ERM}})$$

140B that includes errors scenes 142B and the upsampled training set ($\mathcal{D}_{up}$) 140C, which includes the up sampled scenes and scenes from the training data set ($\mathcal{D}$). Further still, the data store(s) 120 may also include the closed-loop simulation 132 that is performed on the identification policy ($\hat{\pi}_{ERM}$). Based on the performance of the identification policy ($\hat{\pi}_{ERM}$) during the closed-loop simulation, closed-loop metrics 134 are generated, which are ultimately utilized to generate the error set $$(E_{\hat{\pi}_{ERM}})$$

140B.

Before going into the details of CW-ERM and how the policy training system 100 incorporates this methodology, a brief explanation regarding the problem setup will be provided. The traditional formulation of supervised learning for imitation learning, sometimes called behavioral cloning (BC), can be formulated as finding the policy ($\hat{\pi}_{BC}$)

$$\hat{\pi}_{BC} = \underset{\pi \in \Pi}{\mathrm{argmin}} \, \mathbb{E}_{s \sim d_{\pi^*}, a \sim |\pi^*(s)} [\ell(s, a, \pi)] \tag{1}$$

where the state s is sampled from the expert state distribution $d_{\pi^*}$ induced when following the expert policy $\pi^*$. Actions a are sampled from the expert policy $\pi^*(s)$. The loss $\ell$ is also known as the surrogate loss that will find the policy it $\hat{\pi}_{BC}$ that best mimics the unknown expert policy $\pi^*(s)$. In practice, only a finite set of state-action pairs are observed $(s_i, a_i^*)_{i=1}^m$ so the optimization is only approximate. The ERM principle is followed to find the policy $\pi$ from the policy class $\Pi$.

If $$\mathbb{E}_{s \sim d_{\pi^*}, a \sim \pi^*(s)} [\ell(s, a, \pi)] = \epsilon,$$

then it follows that $J(\pi) \le J(\pi^*) + T^2 \epsilon$, where J is the total cost and T is the task horizon. The total cost can grow quadratically in T.

As such, as alluded to in the background section, when the policy $\pi_{BC}$ is deployed, the policy will make mistakes and induce a different state distribution $$d_{\hat{\pi}_{BC}}$$

than the one it was trained on $d_{\pi^*}$. During closed-loop evaluation of driving policies, non-imitative metrics such as collisions and comfort are also evaluated; however, they are often ignored in the surrogate loss or only implicitly learned by imitating the expert due to the difficulty of overcoming differentiability requirements, as smooth approximations of these metrics are still different than the non-differentiable counterparts often used. These policies can often show good results in open-loop training but perform poorly in closed-loop evaluation or when deployed in a real SDV due to the differences between $$d_{\hat{\pi}_{BC}}$$

and $d_{\pi^*}$, where the estimator is no longer consistent.

The CW-ERM methodology described herein seeks to debias a policy network from the open-loop performance towards closed-loop performance, making the model rely on features that are robust to closed-loop evaluation. As mentioned before, the training module 152 includes instructions that, when executed by the processor(s) 110, cause the processor to perform any of the methodologies disclosed within this description, including performing the CW-ERM methodology. The training module 152 may cause the processor(s) 110 to first train the original policy ($\hat{\pi}_{ORIG}$) 130A using the training data set ($\mathcal{D}$) 140A that includes scenes 142A, which results in the identification policy ($\hat{\pi}_{ERM}$) 130B. The training of the original policy ($\hat{\pi}_{ORIG}$) 130A may be in the form of supervised learning.

The scenes 142A may be driving scenes for training a policy for use with an SDV. For example, the training data set ($\mathcal{D}$) 140A may be a collection of driving trajectories collected from one or more agents along with recorded high-definition maps. As such, these driving scenes can include various scenarios, such as stopping behind a lead vehicle, stopping at intersections, and driving among dense automobiles, pedestrians, cyclists, etc. The scenes 142A may vary in length. In one example, the scenes may last as long as 30 seconds, with the majority being approximately 11-13 seconds long.

Once the identification policy ($\hat{\pi}_{ERM}$) 130B has been generated, the training module 152 may cause the processor(s) 110 to do rollouts of the identification policy ($\hat{\pi}_{ERM}$) 130B on a simulator. Moreover, the identification policy ($\hat{\pi}_{ERM}$) 130B is used to control the actions of an agent that is placed within the closed-loop simulation 132. Depending on the actions of the agent and how it interacts with adversarial agents or other actions, closed-loop evaluation metrics 134 are collected by the processor(s) 110.

As such, closed-loop evaluation metrics 134 may be computed by doing rollouts of the identification policy ($\hat{\pi}_{ERM}$) 130B. During the unroll, the trajectories of the agent utilizing the identification policy ($\hat{\pi}_{ERM}$) 130B are recorded. An evaluation plan is then composed of a set of metrics and constraints that are executed over the recorded trajectories. Scenes where the agent violated a constraint (e.g., a collision with an adversarial agent, distance from a reference trajectory, etc.) are counted. Confidence intervals are then computed for each metric using a Binomial exact posterior estimation with a flat prior.

Using the error metrics, the training module 152 may cause the processor(s) 110 to generate the error set ($E_{\hat{\pi}_{ERM}}$) 140B, which can be expressed as:

$$E_{\hat{\pi}_{ERM}} = \{(s_i, a_i) \text{ s.t. } C(s_i, a_i) > 0\}, \quad (2)$$

where $s_i$ is a training data sample or "scene" with a fixed number of timesteps from the training set, and $C(\bullet)$ is a cost such as the number of collisions found during closed-loop rollouts.

Figure 3A:
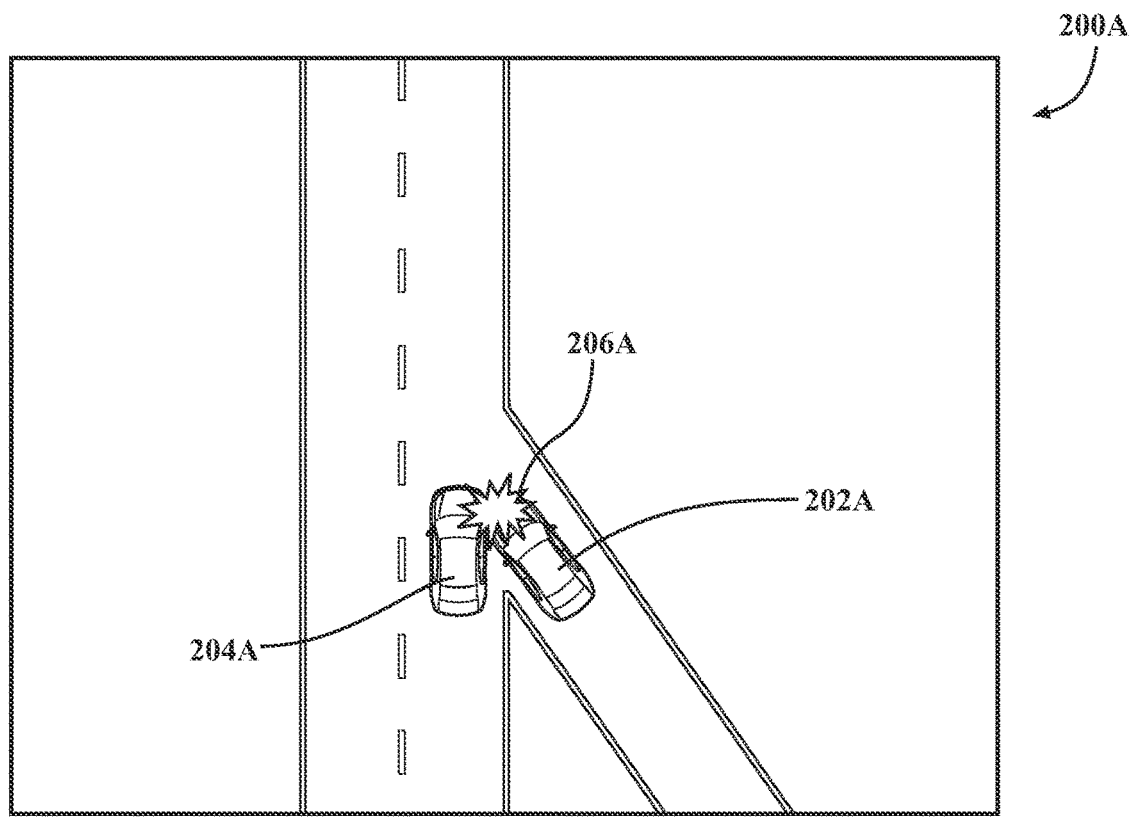
FIGS. 3A and 3B illustrate different examples of a simulation performed on an identification policy to generate closed-loop metrics.
Figure 3B:
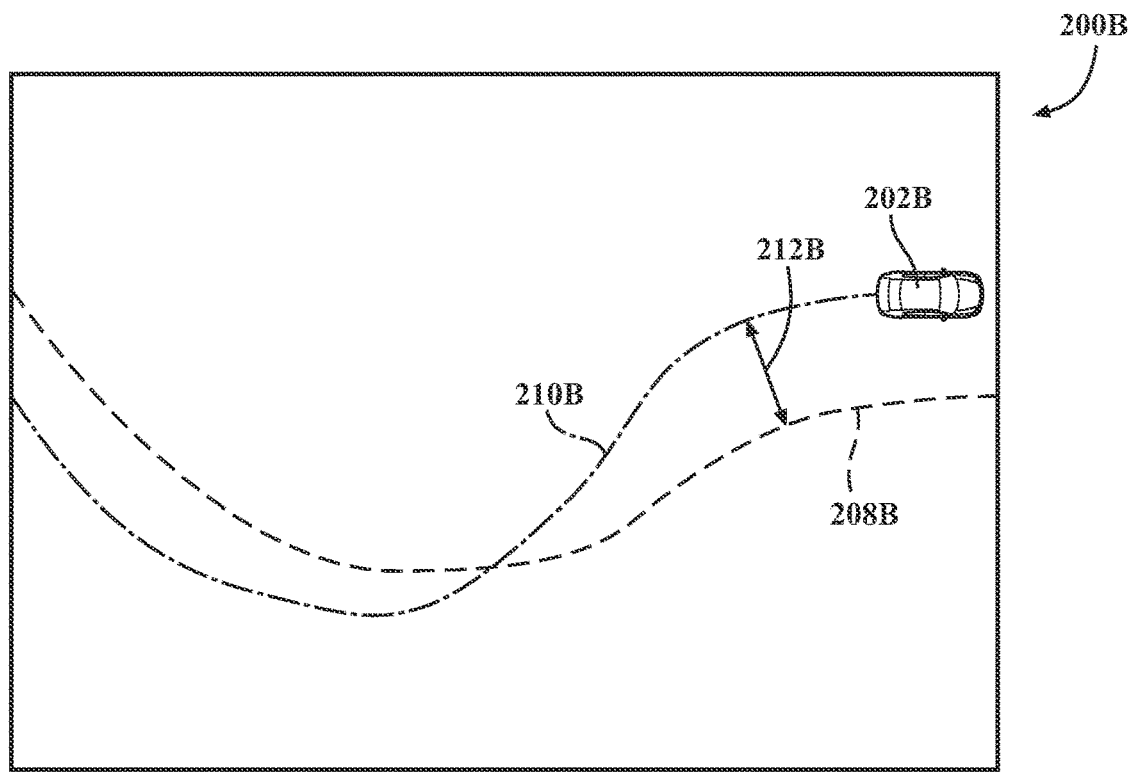

To better visualize when a constraint is violated, reference is made to FIGS. 3A and 3B. Metrics computed in the closed-loop simulator used to construct the error set can consider a number of different metrics, such as the number of front collisions, side collisions, rear collisions, and distance from the reference trajectory.

For example, FIG. 3A illustrates a simulation visual 200A wherein the agent 202A is utilizing the identification policy ($\hat{\pi}_{ERM}$) 130B. Here, the agent 202A violated a constraint by colliding 206A with an adversarial agent 204A. Because this constraint was violated, this scene may be utilized to form part of the error set $$(E_{\hat{\pi}_{ERM}})$$

140B.

Similarly, FIG. 3B illustrates another simulation visual 200B wherein the agent 202B utilizing the identification policy ($\hat{\pi}_{ERM}$) 130B has planned a trajectory 210B that varies from a reference trajectory 208B by a distance 212B. If this distance 212B exceeds the threshold and therefore violating a constraint, this scene may be utilized to form part of the error set $$(E_{\hat{\pi}_{ERM}})$$

140B. The distance from the reference trajectory may consider the entire target trajectory for the current simulated point.

Once the error set $$(E_{\hat{\pi}_{ERM}})$$

104B has been generated, the training module 152 causes the processor(s) 110 to construct the upsampled training set ($\mathcal{D}_{up}$) 140C. Here, the scenes 142B forming the error set $$(E_{\hat{\pi}_{ERM}})$$

140B may be upweighted by an upsampling factor w. The upsampling factor w can vary. In some cases, it has been observed that if the upsampling factor w is too small, the policy may not show significant improvements. Conversely, if the upsampling factor w is too large, the policy may regress. As such, the upsampling factor w can vary from policy to policy and data set to data set and may be determined based on experimentation.

As such, the upsampled training set ($\mathcal{D}_{up}$) 140C may include both the training data set ($\mathcal{D}$) 140A and the error set $$(E_{\hat{\pi}_{ERM}})$$

140B that has been upsampled the upsampling factor w. Using the upsampled training set ($\mathcal{D}_{up}$) 140C, the training module 152 causes the processor(s) 110 to train the original policy ($\hat{\pi}_{ORIG}$) 130A to yield the final policy ($\hat{\pi}_{CW-ERM}$) 130C, which can be expressed as:

$$\operatorname*{argmin}_{\pi \in \Pi} \mathbb{E}_{s \sim d_{\pi^*}, a \sim \pi^*(s)}[w(E_{\hat{\pi}_{ERM}}, s)\ell(s, a, \pi)] \quad (3)$$

The final policy ($\hat{\pi}_{CW-ERM}$) 130C in Equation 3 is somewhat similar to the policy ($\hat{\pi}_{BC}$) trained with ERM in Equation 1, with the key difference of a weighting term based on the error set from closed-loop simulation. By training a policy using CW-ERM, scenes that perform poorly in the closed-loop evaluation should be upsampled, making the policy network robust to the covariate shift seen during inference time while unrolling the policy.

One connection of CW-ERM is with covariate shift correction using density ratio estimation. To correct for the covariate shift, the negative log-likelihood may be weighted by the density ratio r(s):

$$\operatorname*{argmin}_{\pi \in \Pi} \mathbb{E}_{s \sim d_{\pi^*}, a \sim \pi^*(s)}[r(s)\ell(s, a, \pi)] \quad (4)$$

where r(s) is defined as the density ratio between test and training distributions:

$$r(s) = \frac{p_{test}(s)}{p_{train}(s)} \quad (5)$$

In practice, r(s) may be difficult to compute and is thus estimated. The density ratio will be higher when the sample is more important for the test distribution. Instead of using the density ratio, CW-ERM uses a sample from the error set constructed from the training set, where the weighting will also be higher for when the sample is important for the closed-loop performance where the improvement is sought.

Figure 4:
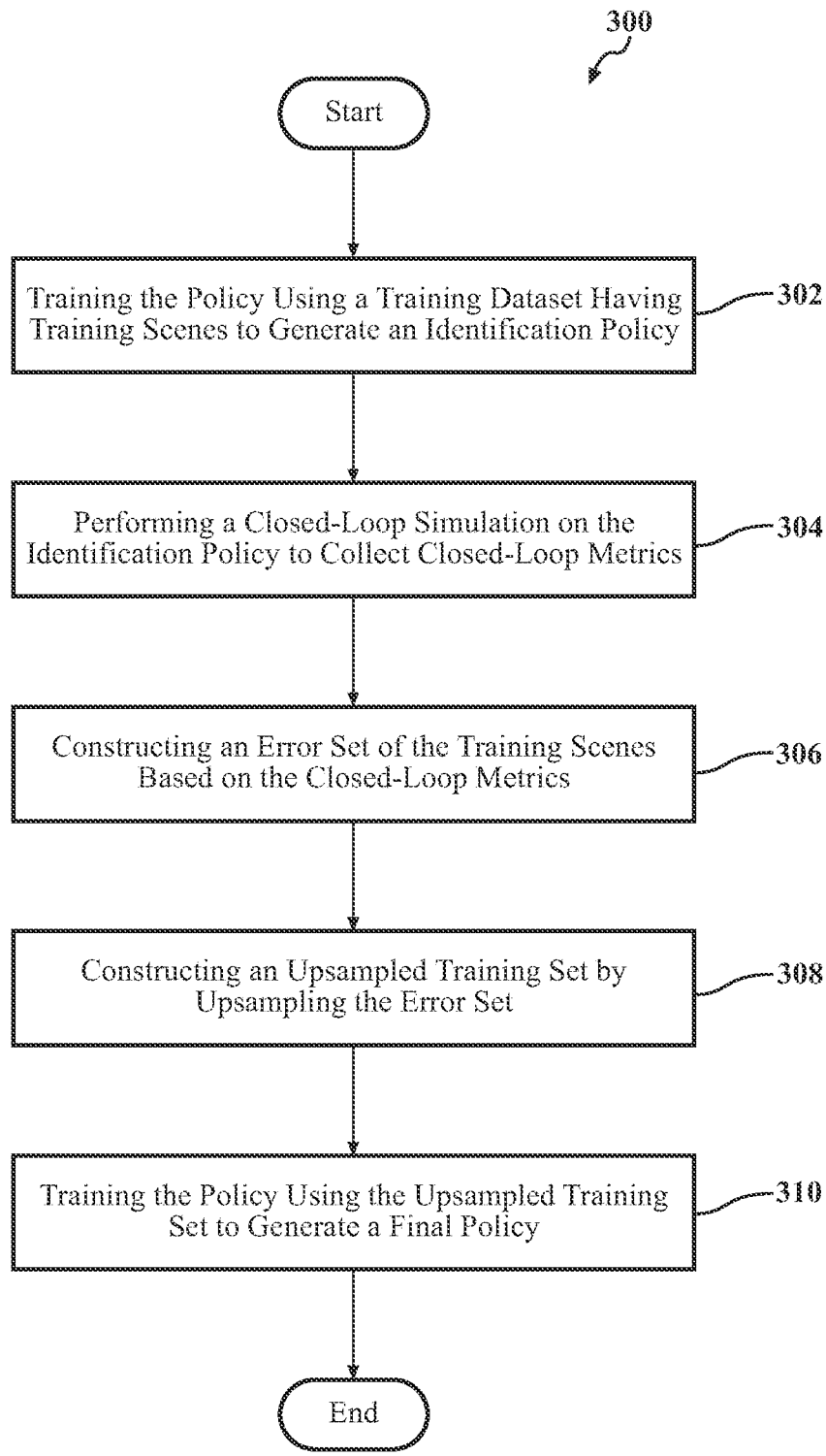
FIG. 4 illustrates a policy training method using closed-loop weighted empirical risk minimization.

Referring to FIG. 4, a method 300 for training a policy utilizing CW-ERM is shown. The method 300 will be described from the viewpoint of the policy training system 100 of FIG. 2. However, it should be understood that this is just one example of implementing the method 300. While method 300 is discussed in combination with the policy training system 100, it should be appreciated that the method 300 is not limited to being implemented within the policy training system 100, but is instead one example of a system that may implement the method 300. Also, it should be understood that many of the steps of the method 300 have already been previously described when describing the policy training system 100 in the paragraphs above. Any description regarding the policy training system 100 not specifically mentioned when describing the method 300 should be understood to also apply to the method 300.

In step 302, the training module 152 includes instructions that, when executed by the processor(s) 110, cause the processor(s) 110 to first train the original policy ($\hat{\pi}_{ORIG}$) 130A using the training data set ($\mathcal{D}$) 140A that includes scenes 142A, which results in the identification policy ($\hat{\pi}_{ERM}$) 130B. As mentioned before, the scenes 142A may be driving scenes for training a policy for use with an SDV in the policy may be trained using supervised learning.

In step 304, the training module 152 includes instructions that, when executed by the processor(s) 110, cause the processor(s) 110 to perform a closed-loop simulation on the identification policy ($\hat{\pi}_{ERM}$) 130B to collect closed-loop metrics. The identification policy ($\hat{\pi}_{ERM}$) 130B is used to control the actions of an agent that is placed within the closed-loop simulation 132. Depending on the actions of the agent and how it interacts with adversarial agents or other actions, closed-loop evaluation metrics 134 are collected by the processor(s) 110.

In step 306, the training module 152 includes instructions that, when executed by the processor(s) 110, cause the processor(s) 110 to generate the error set $$(E_{\hat{\pi}_{ERM}})$$

140B, which is expressed in Equation 2. The error set $$(E_{\hat{\pi}_{ERM}})$$

140B may include a set of the error scenes 142B that caused the agent that was utilizing the identification policy ($\hat{\pi}_{ERM}$) 130B to violate one or more constraints. As such, the scenes forming the error set $$(E_{\hat{\pi}_{ERM}})$$

104B cause the identification policy ($\hat{\pi}_{ERM}$) 130B to select actions that are determined to be unfavorable.

In step 308, the training module 152 includes instructions that, when executed by the processor(s) 110, cause the processor(s) 110 to construct the upsampled training set ($\mathcal{D}_{up}$) 140C. Here, the scenes 142B forming the error set $$(E_{\hat{\pi}_{ERM}})$$

140B may be upweighted by an upsampling factor w. The upsampling factor w can vary. It has been observed that, in some cases, an upsampling factor w that is too low or too high may not have the desired effects. Experimentation may be utilized to determine the appropriate upsampling factor w. The upsampled training set ($\mathcal{D}_{up}$) 140C may include the scenes 142A of the training data set ($\mathcal{D}$) 140A and the scenes of the upweighted error set $$(E_{\hat{\pi}_{ERM}})$$

140B.

In step 310, the training module 152 includes instructions that, when executed by the processor(s) 110, cause the processor(s) 110 to train the original policy ($\hat{\pi}_{ORIG}$) 130A to yield the final policy ($\hat{\pi}_{CW-ERM}$) 130C, which is expressed in Equation 3. Utilizing the method 300 to train a policy, scenes that perform poorly in the closed-loop evaluation are upsampled, making the policy network robust to the covariate shift seen during inference time while unrolling the policy.

Figure 5:
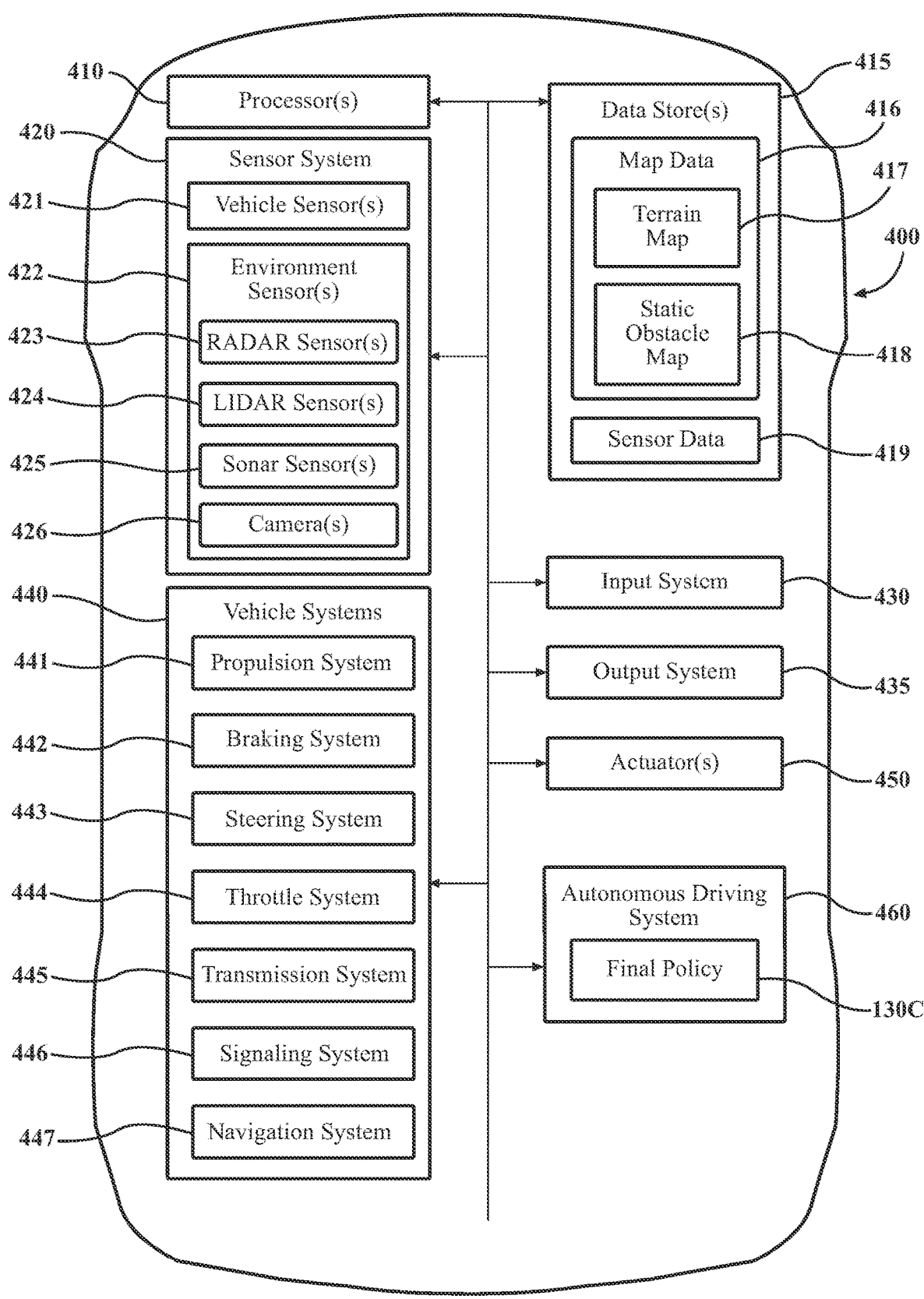
FIG. 5 illustrates a vehicle having an autonomous driving system that incorporates a final policy trained using closed-loop weighted empirical risk minimization.

The final policy ($\hat{\pi}_{CW-ERM}$) 130C can be utilized in a number of different applications. In particular, one such application for SDVs. However, it should be understood that other applications, not just SDVs, can also utilize the training methodologies described herein. FIG. 5 illustrates one such SDV example. Here, a vehicle 400 is illustrated. As used herein, a "vehicle" is any form of powered transport. In one or more implementations, the vehicle 400 is an automobile. While arrangements will be described herein with respect to automobiles, it will be understood that embodiments are not limited to automobiles. In some implementations, the vehicle 400 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 460 that utilizes the final policy ($\hat{\pi}_{CW-ERM}$) 130C.

The vehicle 400 also includes various elements. It will be understood that in various embodiments it may not be necessary for the vehicle 400 to have all of the elements shown in FIG. 5. The vehicle 400 can have any combination of the various elements shown in FIG. 5. Further, the vehicle 400 can have additional elements to those shown in FIG. 5. In some arrangements, the vehicle 400 may be implemented without one or more of the elements shown in FIG. 5. While the various elements are shown as being located within the vehicle 400 in FIG. 5, it will be understood that one or more of these elements can be located external to the vehicle 400. Further, the elements shown may be physically separated by large distances and provided as remote services (e.g., cloud-computing services).

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

As used herein, "autonomous vehicle" or SDV refers to a vehicle that operates in an autonomous mode. "Autonomous mode" refers to navigating and/or maneuvering the vehicle 400 along a travel route using one or more computing systems to control the vehicle 400 with minimal or no input from a human driver. In one or more embodiments, the vehicle 400 is highly automated or completely automated. In one embodiment, the vehicle 400 is configured with one or more semi-autonomous operational modes in which one or more computing systems perform a portion of the navigation and/or maneuvering of the vehicle 400 along a travel route, and a vehicle operator (i.e., driver) provides inputs to the vehicle to perform a portion of the navigation and/or maneuvering of the vehicle 400 along a travel route.

The vehicle 400 can include one or more processor(s) 410. In one or more arrangements, the processor(s) 410 can be a main processor of the vehicle 400. For instance, the processor(s) 410 can be an electronic control unit (ECU). The vehicle 400 can include one or more data store(s) 415 for storing one or more types of data. The data store(s) 415 can include volatile and/or non-volatile memory. Examples of data store(s) 415 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 415 can be a component of the processor(s) 410, or the data store(s) 415 can be operatively connected to the processor(s) 410 for use thereby. The term "operatively connected," as used throughout this description, can include direct or indirect connections, including connections without direct physical contact.

In one or more arrangements, the one or more data store(s) 415 can include map data 416. The map data 416 can include maps of one or more geographic areas. In some instances, the map data 416 can include information or data on roads, traffic control devices, road markings, structures, features, and/or landmarks in the one or more geographic areas. The map data 416 can be in any suitable form. In some instances, the map data 416 can include aerial views of an area. In some instances, the map data 416 can include ground views of an area, including 360-degree ground views. The map data 416 can include measurements, dimensions, distances, and/or information for one or more items included in the map data 416 and/or relative to other items included in the map data 416. The map data 416 can include a digital map with information about road geometry. The map data 416 can be high quality and/or highly detailed.

In one or more arrangements, the map data 416 can include one or more terrain map(s) 417. The terrain map(s) 417 can include information about the ground, terrain, roads, surfaces, and/or other features of one or more geographic areas. The terrain map(s) 417 can include elevation data in the one or more geographic areas. The map data 416 can be high quality and/or highly detailed. The terrain map(s) 417 can define one or more ground surfaces, which can include paved roads, unpaved roads, land, and other things that define a ground surface.

In one or more arrangements, the map data 416 can include one or more static obstacle map(s) 418. The static obstacle map(s) 418 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 418 can have location data, size data, dimension data, material data, and/or other data associated with it. The static obstacle map(s) 418 can include measurements, dimensions, distances, and/or information for one or more static obstacles. The static obstacle map(s) 418 can be high quality and/or highly detailed. The static obstacle map(s) 418 can be updated to reflect changes within a mapped area.

The one or more data store(s) 415 can include sensor data 419. In this context, "sensor data" means any information about the sensors that the vehicle 400 is equipped with, including the capabilities and other information about such sensors. As will be explained below, the vehicle 400 can include the sensor system 420. The sensor data 419 can relate to one or more sensors of the sensor system 420. As an example, in one or more arrangements, the sensor data 419 can include information on one or more LIDAR sensors 424 of the sensor system 420.

In some instances, at least a portion of the map data 416 and/or the sensor data 419 can be located in one or more data store(s) 415 located onboard the vehicle 400. Alternatively, or in addition, at least a portion of the map data 416 and/or the sensor data 419 can be located in one or more data store(s) 415 that are located remotely from the vehicle 400.

As noted above, the vehicle 400 can include the sensor system 420. The sensor system 420 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 420 includes a plurality of sensors, the sensors can work independently from each other. Alternatively, two or more of the sensors can work in combination with each other. In such a case, the two or more sensors can form a sensor network. The sensor system 420 and/or the one or more sensors can be operatively connected to the processor(s) 410, the data store(s) 415, and/or another element of the vehicle 400. The sensor system 420 can acquire data of at least a portion of the external environment of the vehicle 400 (e.g., nearby vehicles).

The sensor system 420 can include any suitable type of sensor. Various examples of different types of sensors will be described herein. However, it will be understood that the embodiments are not limited to the particular sensors described. The sensor system 420 can include one or more vehicle sensor(s) 421. The vehicle sensor(s) 421 can detect, determine, and/or sense information about the vehicle 400 itself. In one or more arrangements, the vehicle sensor(s) 421 can be configured to detect, and/or sense position and orientation changes of the vehicle 400, such as, for example, based on inertial acceleration. In one or more arrangements, the vehicle sensor(s) 421 can include one or more accelerometers, one or more gyroscopes, an inertial measurement unit (IMU), a dead-reckoning system, a global navigation satellite system (GNSS), a global positioning system (GPS), a navigation system 447, and/or other suitable sensors. The vehicle sensor(s) 421 can be configured to detect, and/or sense one or more characteristics of the vehicle 400. In one or more arrangements, the vehicle sensor(s) 421 can include a speedometer to determine a current speed of the vehicle 400.

Alternatively, or in addition, the sensor system 420 can include one or more environment sensors 422 configured to acquire, and/or sense driving environment data. "Driving environment data" includes data or information about the external environment in which an autonomous vehicle is located or one or more portions thereof. For example, the one or more environment sensors 422 can be configured to detect, quantify and/or sense obstacles in at least a portion of the external environment of the vehicle 400 and/or information/data about such obstacles. Such obstacles may be stationary objects and/or dynamic objects. The one or more environment sensors 422 can be configured to detect, measure, quantify and/or sense other things in the external environment of the vehicle 400, such as, for example, lane markers, signs, traffic lights, traffic signs, lane lines, crosswalks, curbs proximate the vehicle 400, off-road objects, etc.

Various examples of sensors of the sensor system 420 will be described herein. The example sensors may be part of the one or more environment sensors 422 and/or the one or more vehicle sensor(s) 421. However, it will be understood that the embodiments are not limited to the particular sensors described.

As an example, in one or more arrangements, the sensor system 420 can include one or more radar sensors 423, one or more LIDAR sensors 424, one or more sonar sensors 425, and/or one or more cameras 426. In one or more arrangements, the one or more cameras 426 can be high dynamic range (HDR) cameras or infrared (IR) cameras.

The vehicle 400 can include an input system 430. An "input system" includes any device, component, system, element or arrangement or groups thereof that enable information/data to be entered into a machine. The input system 430 can receive an input from a vehicle passenger (e.g., a driver or a passenger). The vehicle 400 can include an output system 435. An "output system" includes any device, component, arrangement, or group that enables information/data to be presented to a vehicle passenger (e.g., a person, a vehicle passenger, etc.).

The vehicle 400 can include one or more vehicle systems 440. Various examples of the one or more vehicle systems 440 are shown in FIG. 5. However, the vehicle 400 can include more, fewer, or different vehicle systems. It should be appreciated that although particular vehicle systems are separately defined, each or any of the systems or portions thereof may be otherwise combined or segregated via hardware and/or software within the vehicle 400. The vehicle 400 can include a propulsion system 441, a braking system 442, a steering system 443, a throttle system 444, a transmission system 445, a signaling system 446, and/or a navigation system 447. Each of these systems can include one or more devices, components, and/or a combination thereof, now known or later developed.

The navigation system 447 can include one or more devices, applications, and/or combinations thereof, now known or later developed, configured to determine the geographic location of the vehicle 400 and/or to determine a travel route for the vehicle 400. The navigation system 447 can include one or more mapping applications to determine a travel route for the vehicle 400. The navigation system 447 can include a global positioning system, a local positioning system, or a geolocation system.

The processor(s) 410 and/or the autonomous driving system 460 that utilizes the final policy ($\hat{\pi}_{CW\text{-}ERM}$) 130C can be operatively connected to communicate with the vehicle systems 440 and/or individual components thereof. For example, the processor(s) 410 and/or the autonomous driving system 460 can be in communication to send and/or receive information from the vehicle systems 440 to control the movement, speed, maneuvering, heading, direction, etc. of the vehicle 400. The processor(s) 410 and/or the autonomous driving system 460 that utilizes the final policy ($\hat{\pi}_{CW\text{-}ERM}$) 130C may control some or all of these vehicle systems 440 and, thus, may be partially or fully autonomous.

The processor(s) 410 and/or the autonomous driving system 460 that utilizes the final policy ($\hat{\pi}_{CW\text{-}ERM}$) 130C can be operatively connected to communicate with the vehicle systems 440 and/or individual components thereof. For example, the processor(s) 410 and/or the autonomous driving system 460 that utilizes the final policy ($\hat{\pi}_{CW\text{-}ERM}$) 130C can be in communication to send and/or receive information from the vehicle systems 440 to control the movement, speed, maneuvering, heading, direction, etc., of the vehicle 400. The processor(s) 410 and/or the autonomous driving system 460 that utilizes the final policy ($\hat{\pi}_{CW\text{-}ERM}$) 130C may control some or all of these vehicle systems 440.

The processor(s) 410 and/or the autonomous driving system 460 that utilizes the final policy ($\hat{\pi}_{CW\text{-}ERM}$) 130C may be operable to control the navigation and/or maneuvering of the vehicle 400 by controlling one or more of the vehicle systems 440 and/or components thereof. For instance, when operating in an autonomous mode, the processor(s) 410 and/or the autonomous driving system 460 that utilizes the final policy ($\hat{\pi}_{CW\text{-}ERM}$) 130C can control the direction and/or speed of the vehicle 400. The processor(s) 410 and/or the autonomous driving system 460 that utilizes the final policy ($\hat{\pi}_{CW\text{-}ERM}$) 130C can cause the vehicle 400 to accelerate (e.g., by increasing the supply of fuel provided to the engine), decelerate (e.g., by decreasing the supply of fuel to the engine and/or by applying brakes), and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 400 can include one or more actuators 450. The actuators 450 can be any element or combination of elements operable to modify, adjust and/or alter one or more of the vehicle systems 440 or components thereof to responsive to receiving signals or other inputs from the processor(s) 410 and/or the autonomous driving system 460 that utilizes the final policy ($\hat{\pi}_{CW\text{-}ERM}$) 130C. Any suitable actuator can be used. For instance, the one or more actuators 450 can include motors, pneumatic actuators, hydraulic pistons, relays, solenoids, and/or piezoelectric actuators, to name a few possibilities.

The vehicle 400 can include one or more modules, at least some of which are described herein. The modules can be implemented as computer-readable program code that, when executed by a processor(s) 410, implements one or more of the various processes described herein. One or more of the modules can be a component of the processor(s) 410, or one or more of the modules can be executed on and/or distributed among other processing systems to which the processor(s) 410 is operatively connected. The modules can include instructions (e.g., program logic) executable by one or more processor(s) 410. Alternatively, or in addition, one or more data store(s) 415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The autonomous driving system 460 can be configured to receive and/or determine location information for obstacles within the external environment of the vehicle 400 for use by the processor(s) 410 and/or one or more of the modules described herein to estimate position and orientation of the vehicle 400, vehicle position in global coordinates based on signals from a plurality of satellites, or any other data and/or signals that could be used to determine the current state of the vehicle 400 or determine the position of the vehicle 400 with respect to its environment for use in either creating a map or determining the position of the vehicle 400 in respect to map data.

The autonomous driving system 460 can be configured to determine travel path(s), current autonomous driving maneuvers for the vehicle 400, future autonomous driving maneuvers and/or modifications to current autonomous driving maneuvers based on data acquired by the sensor system 420, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 400, changing travel lanes, merging into a travel lane, and/or reversing, to name a few possibilities. The autonomous driving system 460 can be configured to implement determined driving maneuvers. The autonomous driving system 460 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 460 can be configured to execute various vehicle functions and/or to transmit data to, receive data from, interact with, and/or control the vehicle 400 or one or more systems thereof (e.g., one or more of vehicle systems 440).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and which, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for training a policy comprising steps of:
    training the policy using a training data set having training scenes to generate an identification policy;
    performing a closed-loop simulation on the identification policy to collect closed-loop metrics that count failure scenes where an agent executing the policy violated a constraint;
    based on the closed-loop metrics, constructing an error set that includes the failure scenes;
    constructing an upsampled training set by upsampling the error set;
    training the policy using the upsampled training set to generate a final policy; and
    controlling a movement of a vehicle using the final policy.

2. The method of claim 1, wherein the upsampled training set includes the training data set and the error set that has been upsampled.

3. The method of claim 1, further comprising the step of determining which scenes during the closed-loop simulation that violated a constraint.

4. The method of claim 3, wherein the constraint includes at least one of collisions and distances from a reference trajectory.

5. The method of claim 3, wherein the error set includes the training scenes that violated the constraint.

6. The method of claim 1, wherein the final policy is a self-driving vehicle policy.

7. The method of claim 1, wherein the step of performing the closed-loop simulation includes performing rollouts of the identification policy in log-replayed scenes on a simulator.

8. A system for training a policy, the system comprising:
    a processor; and
    a memory in communication with the processor with instructions that, when executed by the processor, cause the processor to:
        train the policy using a training data set having training scenes to generate an identification policy,
        perform a closed-loop simulation on the identification policy to collect closed-loop metrics that count failure scenes where an agent executing the policy violated a constraint,
        based on the closed-loop metrics, construct an error set that includes the failure scenes,
        construct an upsampled training set by upsampling the error set,
        train the policy using the upsampled training set to generate a final policy; and
        controlling a movement of a vehicle using the final policy.

9. The system of claim 8, wherein the upsampled training set includes the training data set and the error set that has been upsampled.

10. The system of claim 8, wherein the memory further comprises instructions that, when executed by the processor, cause the processor to determine which scenes during the closed-loop simulation that violated a constraint.

11. The system of claim 10, wherein the constraint includes at least one of collisions and distances from a reference trajectory.

12. The system of claim 10, wherein the error set includes the training scenes that violated the constraint.

13. The system of claim 8, wherein the final policy is a self-driving vehicle policy.

14. The system of claim 8, wherein the memory further comprises instructions that, when executed by the processor, cause the processor to perform rollouts of the identification policy in log-replayed scenes on a simulator.

15. A non-transitory computer-readable medium storing instructions that, when executed by a processor, cause the processor to:
    train a policy using a training data set having training scenes to generate an identification policy;

perform a closed-loop simulation on the identification policy to collect closed-loop metrics that count failure scenes where an agent executing the policy violated a constraint;

based on the closed-loop metrics, construct an error set that includes the failure scenes;

construct an upsampled training set by upsampling the error set;

train the policy using the upsampled training set to generate a final policy; and control a movement of a vehicle using the final policy.

16. The non-transitory computer-readable medium of claim 15, wherein the upsampled training set includes the training data set and the error set that has been upsampled.

17. The non-transitory computer-readable medium of claim 15, wherein the non-transitory computer-readable medium further comprises instructions that, when executed by the processor, cause the processor to determine which scenes during the closed-loop simulation that violated a constraint.

18. The non-transitory computer-readable medium of claim 17, wherein the constraint includes at least one of collisions and distances from a reference trajectory.

19. The non-transitory computer-readable medium of claim 17, wherein the error set includes the training scenes that violated the constraint.

20. The non-transitory computer-readable medium of claim 15, wherein the non-transitory computer-readable medium further comprises instructions that, when executed by the processor, cause the processor to perform rollouts of the identification policy in log-replayed scenes on a simulator.

* * * * *